US008968637B2

(12) United States Patent
Krueger et al.

(10) Patent No.: US 8,968,637 B2
(45) Date of Patent: Mar. 3, 2015

(54) METHOD AND SYSTEM FOR FABRICATING DOME SHAPED LTCC SUBSTRATES

(75) Inventors: Daniel S. Krueger, Liberty, MO (US); Cristina Elizabeth Fadner, Overland Park, KS (US); Gregory Vincent Miller, Gladstone, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 324 days.

(21) Appl. No.: 13/525,613

(22) Filed: Jun. 18, 2012

(65) Prior Publication Data
US 2013/0334742 A1    Dec. 19, 2013

(51) Int. Cl.
| B23B 1/00 | (2006.01) |
| B28B 1/00 | (2006.01) |
| B32B 18/00 | (2006.01) |
| C04B 37/00 | (2006.01) |
| C04B 37/04 | (2006.01) |

(52) U.S. Cl.
CPC . *B28B 1/00* (2013.01); *B32B 18/00* (2013.01); *C04B 37/001* (2013.01); *C04B 37/042* (2013.01); *C04B 2235/36* (2013.01); *C04B 2235/6028* (2013.01); *C04B 2237/343* (2013.01); *C04B 2237/86* (2013.01)
USPC ...................................................... 264/607

(58) Field of Classification Search
CPC .... C04B 2235/6025; B28B 1/30; B28B 21/72
USPC ...................................................... 264/607
See application file for complete search history.

(56) References Cited

U.S. PATENT DOCUMENTS

| 1,489,694 | A | * | 4/1924 | Brown ......................... 264/605 |
| 5,028,473 | A | | 7/1991 | Vitriol et al. |
| 5,050,976 | A | * | 9/1991 | Flint ............................. 359/851 |
| 5,935,513 | A | * | 8/1999 | Martreuil et al. ............. 264/608 |
| 6,097,135 | A | * | 8/2000 | Cappabianca ................ 310/367 |
| 6,254,708 | B1 | * | 7/2001 | Cappabianca ............. 156/89.12 |
| 7,067,907 | B2 | | 6/2006 | Koschmieder et al. |
| 7,494,557 | B1 | | 2/2009 | Peterson |
| 7,856,706 | B2 | | 12/2010 | Kumar et al. |
| 7,897,055 | B2 | | 3/2011 | Tu et al. |
| 7,935,559 | B1 | | 5/2011 | Giffard et al. |
| 7,968,043 | B2 | | 6/2011 | Ito et al. |

OTHER PUBLICATIONS

Article titled: "Three-dimensional low-temperature co-fired ceramic shells for miniature systems applications" by Jun Li and G K Ananthasuresh, Published Mar. 22, 2002; online at stacks.iop.org/JMM/12/198.

* cited by examiner

*Primary Examiner* — Joseph S Del Sole
*Assistant Examiner* — Russell Kemmerle, III
(74) *Attorney, Agent, or Firm* — Hovey Williams LLP

(57) ABSTRACT

A system for the fabrication of dome shaped low temperature cofired ceramic (LTCC) substrates comprises a plurality of prefired substrates, a first mandrel, and a second mandrel. The prefired substrates may form a stack and each may include a circular central portion and a plurality of segments uniformly distributed along the circumference of the central portion. Each segment may include a first edge, an opposing second edge, and an end edge. The first and second edges each may have an inner end and an opposing outer end. The end edge may be coupled to the outer end of the first and second edges. The first mandrel may have a first circumference and may be configured to receive the prefired substrates while the stack is formed. The second mandrel may have a second circumference smaller than the first circumference and may be configured to retain the stack during a firing process.

29 Claims, 4 Drawing Sheets ved with support from the
U.S. government under Contract No. DE-ACO4-AL66850
METHOD AND SYSTEM FOR FABRICATING DOME SHAPED LTCC SUBSTRATES

FEDERALLY SPONSORED RESEARCH OR DEVELOPMENT PROGRAM

The present invention was developed with support from the U.S. government under Contract No. DE-ACO4-AL66850 with the U.S. Department of Defense. Accordingly, the U.S. government has certain rights in the present invention.

BACKGROUND OF THE INVENTION

1. Field of the Invention

Embodiments of the present invention relate to ceramic substrate fabrication. More particularly, embodiments of the present invention relate to methods and systems for fabricating dome-shaped ceramic substrates.

2. Description of the Related Art

Microelectronic ceramic circuit technologies, such as low-temperature cofired ceramic (LTCC) circuits, offer the capability of high speed and high performance, particularly high frequency, operation for components such as sensors and antennae. LTCC circuits often include one or more layers of ceramic substrate with circuit components and conductors formed thereon. The combination is fired to form the LTCC circuit. The LTCC circuit has a planar or, occasionally, a tubular shape. However, many applications require the LTCC circuit to have a non-tubular curved shape. When using planar or tubular shaped LTCC circuits in these applications, additional electrical connectors may be required in the form of flex cables, wires, and the like. The added connectors may introduce electrical signal loss leading to reduced performance or requiring compensation circuitry. The connectors may also require a modification in packaging for the application.

SUMMARY OF THE INVENTION

Embodiments of the present invention solve the above-mentioned problems and provide a distinct advance in the art of fabricating ceramic substrates. More particularly, various embodiments of the invention provide an improved system and method for fabricating dome, box, or other complex shaped ceramic substrates.

A system in accordance with an embodiment of the present invention may broadly comprise a plurality of prefired substrates, a first mandrel, and a second mandrel. The prefired substrates may be constructed from ceramic and glass-based material and may be used to form a stack. Each prefired substrate may include a circular central portion and a plurality of segments uniformly distributed along the circumference of the central portion. Each segment may include a first edge, an opposing second edge, and an end edge. The first and second edges each may have an inner end and an opposing outer end and may curve outwardly away from one another. The end edge may be coupled to the outer end of the first and second edges.

The first mandrel may have a first circumference and may be configured to receive the prefired substrates while the stack is formed. The second mandrel may have a second circumference smaller than the first circumference and may be configured to retain the stack during a firing process.

A method in accordance with an embodiment of the present invention may broadly comprise the steps of: preparing a plurality of prefired substrates of ceramic and glass based material each to include a central portion and a plurality of segments extending therefrom, each prefired substrate having a diameter; placing a first prefired substrate on a first mandrel with an arcuate shaped outer surface; positioning the segments of the first prefired substrate on the first mandrel to abut one another; placing a second prefired substrate on top of the first prefired substrate to form a stack; positioning the segments of the second prefired substrate to abut one another; placing additional prefired substrates on top of the stack; removing the stack of prefired substrates from the first mandrel; placing the stack of prefired substrates on a second mandrel that is smaller in circumference than the first mandrel; and firing the stack of prefired substrates and the second mandrel.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
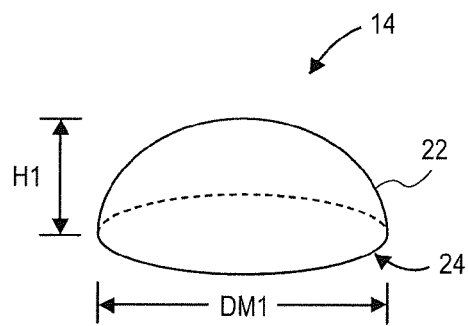
FIG. 1 is a perspective view of a first mandrel that is part of a system for the fabrication of dome shaped low temperature cofired ceramic (LTCC) substrates constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "various embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A system 10 for the fabrication of dome shaped low temperature cofired ceramic (LTCC) substrates 12, constructed in accordance with various embodiments of the current invention, is shown in FIGS. 1-9 and may broadly comprise a first mandrel 14, a second mandrel 16, and a plurality of prefired substrates 18. The system 10 may optionally include an outer mold 20. The LTCC substrate 12, shown in FIG. 9, produced by the system 10 and a method presented below is shown in FIG. 10. Although the specification discusses a system and method for forming LTCC substrates, the system and method may also be used for forming high temperature cofired ceramic (HTCC) substrates. Furthermore, although the specification discusses a system and method for the fabrication of dome shaped substrates, the system and method may also be used for fabricating substrates of other shapes such as a box or other complex shapes.

The first mandrel 14 may include material that forms a first outer surface 22 with an arcuate shape, as shown in FIGS. 1, 5, and 7-8. The first mandrel 14 may be solid or hollow and may be formed from materials such as metals or plastics. An exemplary first mandrel 14 may be constructed from Lexan. The first outer surface 22 of the first mandrel 14 may be shaped to match the shape of the inner surface of the final LTCC substrate 12 and may generally have the shape of a portion of the surface of a sphere, such as a hemisphere or a portion thereof. The first mandrel 14 may include a first base 24 and may have a first height H1 (the distance from the first base 24 to the first outer surface 22) and a first diameter DM1, as indicated in FIG. 1.

Figure 2:
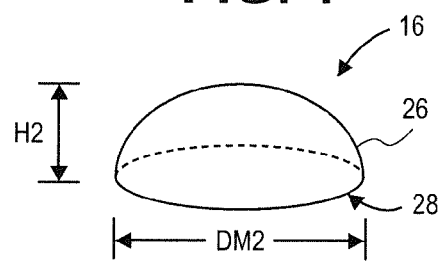
FIG. 2 is a perspective view of a second mandrel that is part of the system.
Figure 9:
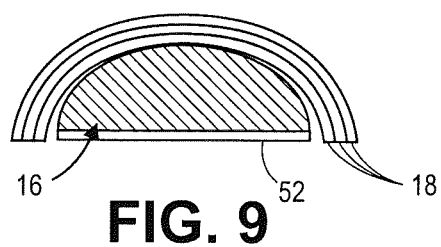
FIG. 9 is a sectional view of the prefired substrates placed on the second mandrel.
Figure 10:
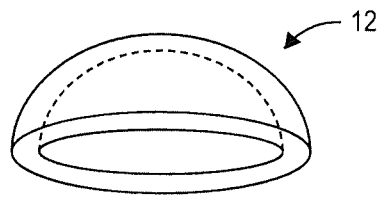
FIG. 10 is a bottom perspective view of the dome shaped substrate after firing.

The second mandrel 16 may include material that forms a second outer surface 26 with an arcuate shape, as shown in FIGS. 2 and 9, and may include a second base 28, a second height H2, and a second diameter DM2. The second mandrel 16 may be solid or hollow and may be formed from materials that can withstand the temperatures of the firing process such as metals, graphite, or ceramics. An exemplary second mandrel 16 may be constructed from ceramic. The second mandrel 16 may have a substantially similar shape to the first mandrel 14 but may be smaller than the first mandrel 14, such that the second height H2 is less than the first height H1 and the second diameter DM2 is less than the first diameter DM1. The second mandrel 16 may also have a smaller circumference that the first mandrel 14 such that the decrease in circumference from the first mandrel 14 to the second mandrel 16 may correspond to the amount by which the material of the prefired substrates 18 shrinks during the firing process. For example, if the prefired substrate 18 material shrinks 10% during firing, then the circumference of the second mandrel 16 may be 10% less than the circumference of the first mandrel 14.

Figure 3:
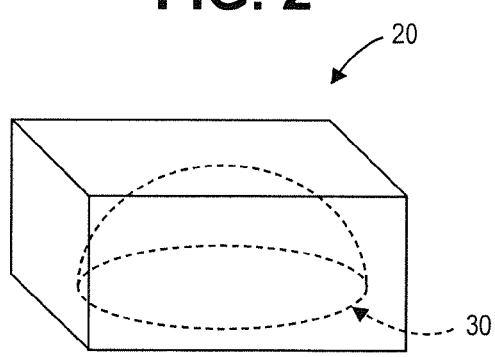
FIG. 3 is a perspective view of an outer mold that is part of the system.

The outer mold 20, as seen in FIG. 3, may include material that forms a concave inner surface 30 of a similar shape to the first outer surface 22 of the first mandrel 14. The rest of the outer mold 20 may have a cylindrical, hemispherical, cubic, or rectangular box shape or other shape that makes the outer mold 20 easy to handle. In certain embodiments, the outer mold 20 may be formed from two separate pieces, typically wherein each piece is half of the mold 20. The outer mold 20 may be constructed from materials such as metals or plastics. An exemplary outer mold 20 may be constructed from room temperature vulcanizing (RTV) silicone.

Figure 5:
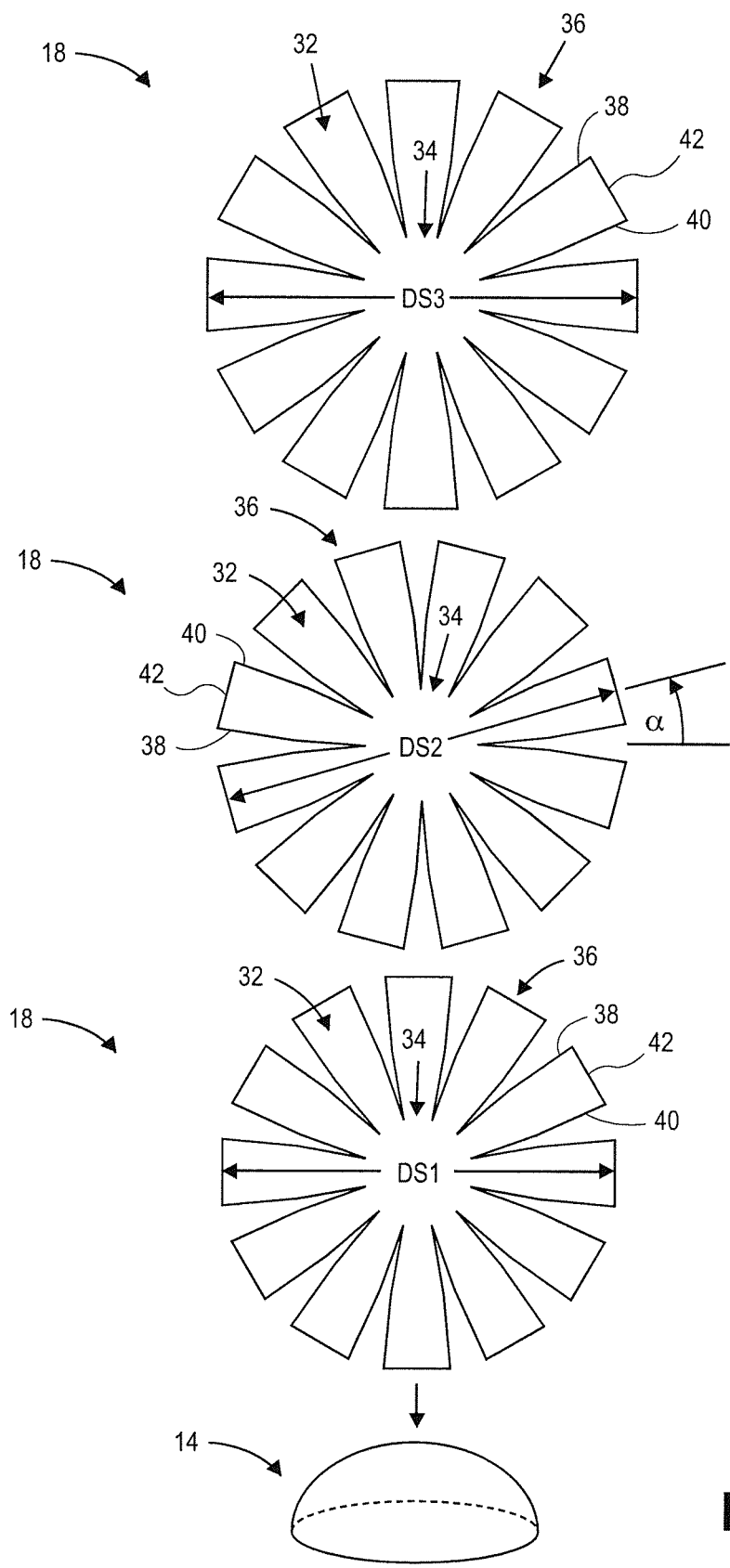
FIG. 5 is a view of the prefired substrates aligned with the first mandrel.

The prefired substrate 18 may include ceramic-based ($Al_2O_3$) material, particularly ceramic and glass material. An exemplary prefired substrate 18 may include P2, 9K7, Hereaus, Ferro, 951PT, or 951PX Green Tape from DuPont of Wilmington, Del., also known as green sheets. The prefired substrate 18, as best seen in FIG. 5, may have an inner surface 32 and may include a central portion 34 and a plurality of segments 36. The central portion 34 may be positioned at the center of the prefired substrate 18 and may have a generally circular shape.

Each segment 36 may include a first edge 38, a second edge 40, and an end edge 42. The first edge 38 and the second edge 40 may generally oppose each other and may each have a curved shape, such that the first edge 38 and the second edge 40 curve generally outward away from one another. The first edge 38 and the second edge 40 may also each include an inner end and an opposing outer end. The end edge 42 may be coupled to the outer end of the first edge 38 and the outer end of the second edge 40. The end edge 42 may have a straight line shape or may have an outward curvature. In addition, each segment 36 may have a first width at the inner end of the first edge 38 and the second edge 40 and a second width at the outer end of the first edge 38 and the second edge 40, wherein the second width is greater than the first width.

The segments 36 are generally evenly distributed around the central portion 34, such that the inner end of the first edge 38 and the second edge 40 attach to the circumference of the central portion 34. The first edge 38 of one segment 36 may be adjacent to the second edge 40 of the neighboring segment 36. The inner end of the first edge 38 of one segment 36 may be coupled to the inner end of the second edge 40 of the neighboring segment 36. Furthermore, the outer end of the first edge 38 of one segment 36 may be spaced apart from the outer end of the second edge 40 of the neighboring segment 36. The segments 36 may also be positioned such that the outer ends of the first edge 38 and the second edge 40 may lie on the circumference of a circle larger than the circle of the central portion 34.

The prefired substrate 18 may include at least two segments 36, although practical considerations may limit the maximum number of segments 36. An exemplary prefired substrate 18 may include eight to twelve segments 36. The segments 36 may have an equal angular spacing along the central portion 34 of the prefired substrate 18. For example, an eight-segment prefired substrate 18 may have the segments 36 spaced at 45 degrees from the center of one segment 36 to the center of an adjacent segment 36, and a twelve-segment prefired substrate 18, as shown in FIG. 5, may have segments 36 spaced at 30 degrees from center to center.

Figure 4:
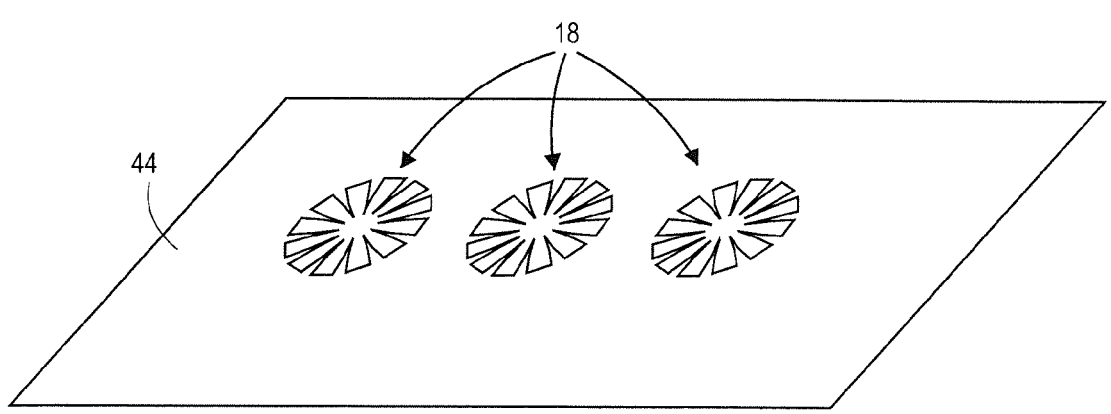
FIG. 4 is a perspective view of a plurality of prefired substrates formed from a sheet of ceramic material that are part of the system.

Referring to FIGS. 4-9, the system 10 may be used as follows. A plurality of prefired substrates 18 may be formed from one or more sheets 44 of ceramic and glass-based material. Each prefired substrate 18 may include a central portion 34 and a plurality of segments 36 extending therefrom. Typically, each prefired substrate 18 has the same number of segments 36. The sheet 44 may be etched, cut with a blade, a die, a laser, etc., or otherwise modified to form the segmented pattern. The result may be a single piece of material that forms the prefired substrate 18. Multiple prefired substrates 18 may be formed from a single sheet 44, as shown in FIG. 4, or multiple sheets 44. The number of prefired substrates 18 that are utilized may depend on the implementation of the LTCC substrate 12 and the thickness of each prefired substrate 18, as well as the complexity of the desired circuit. An exemplary thickness of the prefired substrate 18 may be approximately 0.01 inches. Thus, for example, an LTCC substrate 12 required to have a thickness of 0.08 inches may be formed from eight prefired substrates 18.

In addition, the prefired substrate 18 may have a diameter DS when it is cut or formed. The diameter DS may be the distance from the end edge 42 of one segment 36 through the central portion 34 to the end edge 42 of an opposing segment 36. The diameter DS may vary depending on the position of the prefired substrate 18 in a stack 46 of prefired substrates 18, as discussed below. The diameter DS for each prefired substrate 18 may be determined such that the end edges 42 of the segments 36 align with one another when the stack 46 is formed, also as discussed below. The diameter DS may increase for each successive prefired substrate 18 in the stack 46 from bottom to top. Thus, the prefired substrate 18 on the bottom of the stack 46 may have the smallest diameter DS, while the prefired substrate 18 on the top of the stack 46 may have the largest diameter DS. As shown in FIG. 4, the lower prefired substrate 18 with diameter DS1 is on the bottom of the stack 46 with the middle prefired substrate 18 having diameter DS2 in the middle of the stack 46 and the upper prefired substrate 18 having diameter DS3 on the top of the stack 46. Therefore, DS1 is less than DS2 which is less than DS3. The amount that the diameter DS is increased in successive prefired substrates 18 may depend on factors such as, but not limited to, the thickness of each prefired substrate 18, the amount by which the prefired substrate 18 material shrinks during the firing process, and others.

Furthermore, while the diameter DS of a prefired substrate 18 increases, the dimensions of the features of the prefired substrate 18 increase as well. For example, the central portion 34 may increase in diameter. The increase in diameter DS of the prefired substrate 18 may also result in an increase in the circumference. Accordingly, the width of each segment 36 may increase as well.

A first prefired substrate 18 may be placed on the first mandrel 14 with the inner surface 32 of the prefired substrate 18 contacting the first outer surface 22. In various embodiments, the first outer surface 22 may be prepared with a lubricant, a release film, or similar non-stick coating or film. The center of the central portion 34 may be aligned with a central vertical axis of the first mandrel 14. The segments 36 may be positioned on the first mandrel 14 abutting one another, such that the first edge 38 of one segment 36 is in contact with the second edge 40 of an adjacent segment 36 from the inner end to the outer end of both segments 36. The abutment or contact of one segment 36 with another segment 36 may form a seam 48. Once placed on the first mandrel 14, the end edges 42 of the segments 36 may generally form the circumference of a first circle.

A second prefired substrate 18 may be placed on top of the first prefired substrate 18. Instead of placing the second prefired substrate 18 on the first prefired substrate 18 such that the segments 36 of the second prefired substrate 18 align with the segments 36 of the first prefired substrate 18, the second prefired substrate 18 may be rotated about its center by an angle $\alpha$, as indicated in FIG. 5. The angle $\alpha$ may be equal to one half times 360 degrees divided by the number of segments 36. The rotation ensures that the seams 48 of the first prefired substrate 18 align with the centers of the segments 36 of the second prefired substrate 18 and vice-versa. In the exemplary embodiment of the invention shown in FIG. 5, the angle $\alpha$ may be equal to 0.5×360 degrees/12, which equals 15 degrees. Thus, the second prefired substrate 18 may be rotated by 15 degrees as it is placed on the first prefired substrate 18. The segments 36 of the second prefired substrate 18 may be positioned to abut one another and such that the first edge 38 of one segment 36 is in contact with the second edge 40 of an adjacent segment 36 from the inner end to the outer end of both segments 36. Furthermore, the end edges 42 of the segments 36 of the second prefired substrate 18 may generally form the circumference of a second circle which may align with the circumference of the first circle formed by the end edges 42 of the segments of the first prefired substrate 18

Figure 6:
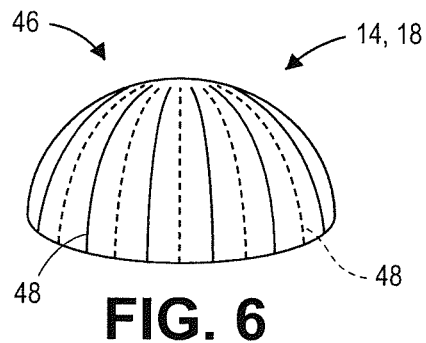
FIG. 6 is a perspective view of the prefired substrates placed on the first mandrel and shaped thereto.
Figure 7:
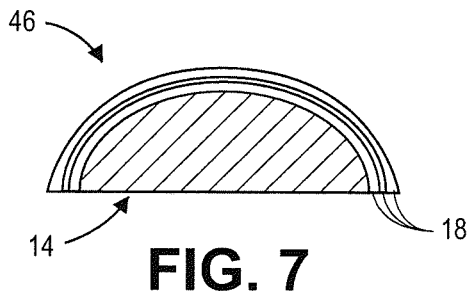
FIG. 7 is a sectional view of the prefired substrates placed on the first mandrel.

Additional prefired substrates 18 may be stacked one upon another in the same fashion as the first and second prefired substrates 18 such that all of the odd-numbered prefired substrates 18 align with one another and all of the even-numbered prefired substrates 18 align with one another but are rotated with respect to the odd numbered prefired substrates 18 by the angle $\alpha$. An exemplary embodiment of the stack 46 of prefired substrates 18 is shown in FIGS. 6-7 and includes three prefired substrates 18 placed on the first mandrel 14 and shaped thereto. The end edges 42 of the segments 36 of the three prefired substrates 18 generally align with one another. The seams 48 of the third (top) prefired substrate 18 are shown in FIG. 6 in solid line. The seams 48 of the second (lower) prefired substrate 18 are shown in dashed line.

Generally, it is desirable to utilize multiple prefired substrates 18 that are stacked one upon another rather than a single prefired substrate 18 to form the LTCC substrate 12 because the stack 46 with rotated layers overlaps the seams 48 of the segments 36 from one layer to the next. Overlapping of the seams 48 produces an LTCC substrate 12 that has better uniformity, hermeticity, and connectivity between the segments 36.

In various embodiments, the outer mold 20 may be placed on top of the stack 46 of prefired substrates 18. The inner surface 30 of the outer mold 20 may be coated or may include a release film which contacts the top layer of the prefired substrates 18.

Figure 8:
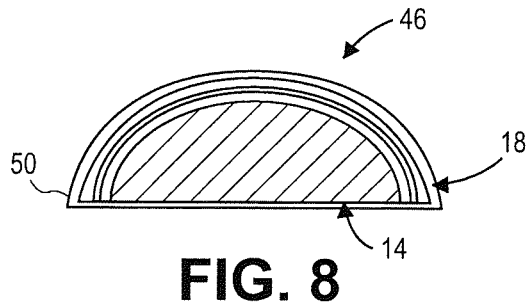
FIG. 8 is a sectional view of the prefired substrates and the first mandrel placed in a bag for isostatic lamination.

The outer mold 20 (if used), the first mandrel 14, and the stack 46 of prefired substrates 18, as they are positioned one on another, may be placed in a bag 50 and sealed, as shown in FIG. 8, for isostatic lamination using known lamination techniques. The combination of the bag 50, the stack 46 of prefired substrates 18, the outer mold 20 (if used), and the first mandrel 14 may be heated to a temperature of approximately 70 degrees Celsius to activate the resins of the prefired substrate 18 material. The stack 46 of prefired substrates 18 may be removed from the bag 50, the outer mold 20, and the first mandrel 14. At this point, the stack 46 of prefired substrates 18 may be generally adhered to one another so that they can be handled as a unit.

The second mandrel 16 may be placed on a stand 52 or other riser structure. The stack 46 of prefired substrates 18 may be placed on top of the second mandrel 16 such that the inner surface 32 of the bottom prefired substrate 18 contacts the second outer surface 26 at least along a central vertical axis, as shown in FIG. 9. The height of the stand 52 may be set so that the second mandrel 16 contacts the stack 46 of prefired substrates 18 when the stack 46 is placed on the second mandrel 16.

The combination of the prefired substrate 18 and the second mandrel 16 may be heated using known firing techniques. After the firing, the substrate stack 46 is an LTCC substrate 12, as shown in FIG. 10, and may be removed from the second mandrel 16. The LTCC substrate 12 may be generally monolithic as a result of the segments 36 of the prefired substrate 18 fusing with one another. The LTCC substrate 12 may have conductors, dielectrics, circuit components, and combinations thereof applied with aerosol jet printing or other direct write techniques.

Figure 11:
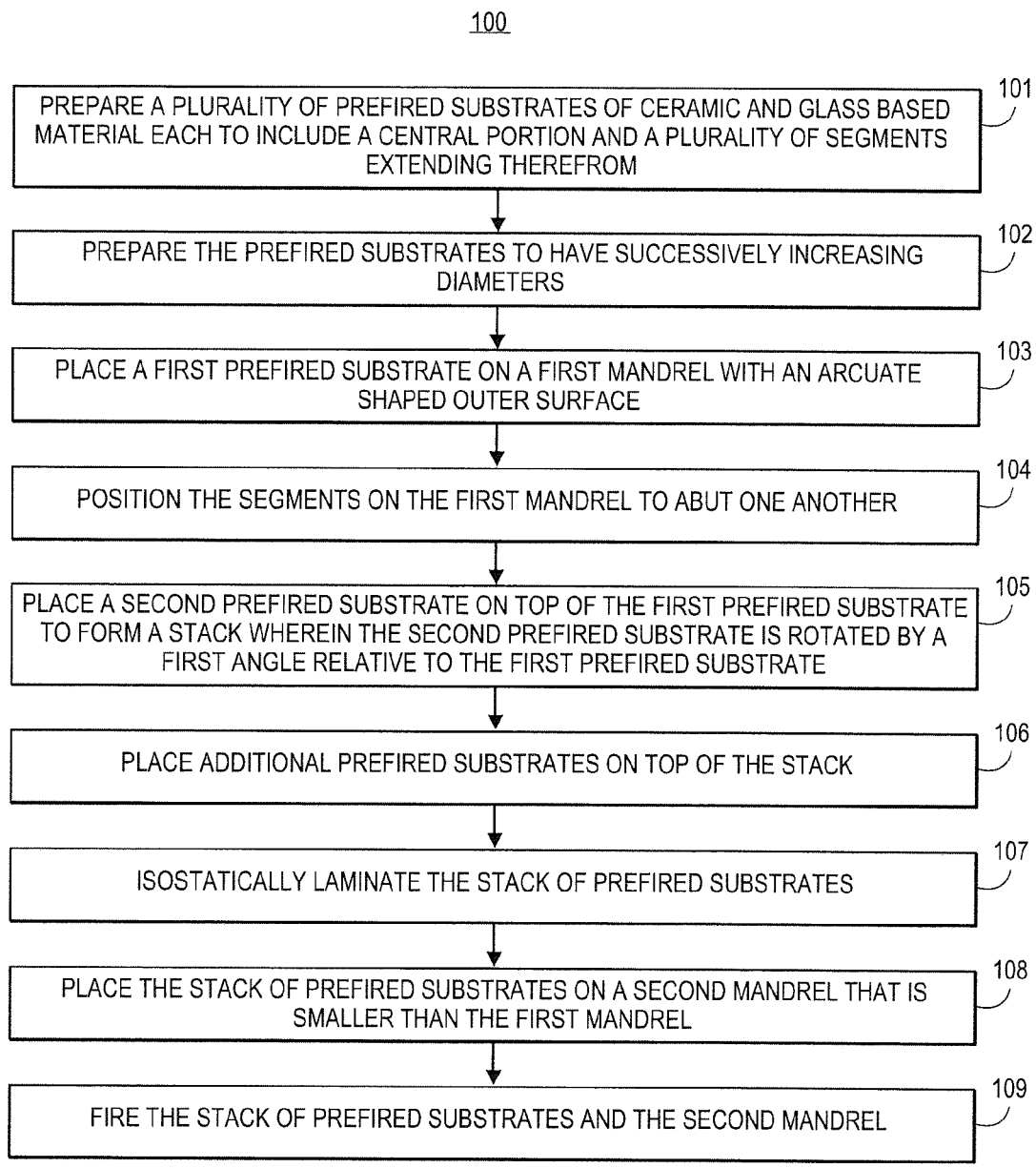
FIG. 11 is a flow diagram of at least a portion of the steps of a method for the fabrication of dome shaped LTCC substrates.

A method 100 for the fabrication of dome shaped LTCC substrates using the system 10 in accordance with various embodiments of the present invention is listed in FIG. 11. The steps of the method 100 may be performed in the order as shown in FIG. 11, or they may be performed in a different order. Furthermore, some steps may be performed concurrently as opposed to sequentially. In addition, some steps may not be performed.

Referring to step 101, a plurality of prefired substrates 18 of ceramic and glass based material are prepared to include a central portion 34 and a plurality of segments 36 extending therefrom, as shown in FIG. 4. The central portion 34 is prepared to have a circular shape with the segments 36 coupled to the circumference of the central portion 34. The segments 36 may have an equal angular spacing along the central portion 34. Each segment 36 is prepared to include a first edge 38, a second edge 40, and an end edge 42 with the first edge 38 and the second edge 40 opposing one another and the end edge 42 positioned therebetween. The first edge 38 and the second edge 40 are prepared to each have an inner end, an opposing outer end, and a curvature outward away from one another. In various embodiments, each prefired substrate 18 is a single piece of material.

Referring to step 102, the prefired substrates 18 are prepared to have successively increasing diameters, as shown in FIG. 5. The diameter DS of the prefired substrate 18 may be the distance from the end edge 42 of one segment 36 through the central portion 34 to the end edge 42 of an opposing segment 36. The amount that the diameter DS is increased in successive prefired substrates 18 may depend on factors such as, but not limited to, the thickness of each prefired substrate 18, the amount by which the prefired substrate 18 material shrinks during the firing process, and others.

Referring to step 103, a first prefired substrate 18 is placed on a first mandrel 14 with an arcuate shaped first outer surface 22. The first prefired substrate 18 is the prefired substrate 18 with the smallest diameter DS. The first mandrel 14 may be solid or hollow and may be formed from materials such as metals or plastics. In addition, the first outer surface 22 may generally have a rounded shape or the shape of a portion of the surface of a sphere, such as a hemisphere or a portion thereof. A center of the central portion 34 is aligned with a central vertical axis of the first mandrel 14.

Referring to step 104, the segments 36 are positioned on the first mandrel 14 to abut one another. The segments 36 of the first prefired substrate 18 are placed such that the first edge 38 of one segment 36 is in contact with the second edge 40 of an adjacent segment 36 from the inner end to the outer end of both segments 36.

Referring to step 105, a second prefired substrate 18 is placed on top of the first prefired substrate 18 to create a stack 46. The second prefired substrate 18 is the prefired substrate 18 with the second smallest diameter DS and is rotated about the central portion 34 by a first angle α with respect to the first prefired substrate 18. The angle α may be equal to one half times 360 degrees divided by the number of segments 36. The segments 36 of the second prefired substrate 18 are positioned to abut one another. Given the rotation, the seams 48 between segments 36 of the first prefired substrate 18 align with the center of the segments 36 of the second prefired substrates 18, and vice versa.

Referring to step 106, additional prefired substrates 18 are placed on the stack 46 and shaped thereto, as seen in FIGS. 6-7. The additional prefired substrates 18 may be placed on the stack 46 in order of increasingly larger diameters DS. Thus, in the example shown in FIGS. 4-9, DS1 is less than DS2 which is less than DS3. Furthermore, the odd-numbered prefired substrates 18 may be rotationally aligned with one another. The even-numbered prefired substrates 18 may be rotationally aligned with one another and rotated by the angle α relative to the odd-numbered prefired substrates 18. In various embodiments, an outer mold 20 may be placed on top of the stack 46 of prefired substrates 18. The outer mold 20 may have an inner surface 30 shaped similarly to the first outer surface 22 of the first mandrel 14. The inner surface 30 may be coated or may include a release film which contacts the top layer of the prefired substrates 18.

Referring to step 107, the stack 46 of prefired substrates 18 is isostatically laminated. The stack 46 of prefired substrates 18 as they are stacked on the first mandrel 14 along with optionally the outer mold 20 may be placed in a bag 50 and sealed, as shown in FIG. 8. The combination thereof may be isostatically laminated, as is known.

Referring to step 108, the stack 46 of prefired substrates 18 is placed on a second mandrel 16. After lamination, the stack 46 may be removed from the bag 50 and the first mandrel 14, and optionally the outer mold 20. The second mandrel 16 may include a second outer surface 26 and may be smaller in circumference than the first mandrel 14, typically by the amount by which the material of the prefired substrates 18 shrinks during the firing process. In various embodiments, the second mandrel 16 may be placed on a base or other riser structure. The stack 46 of prefired substrates 18 may be placed on the second mandrel 16 such that at least a portion of the second outer surface 26 contacts the bottom prefired substrate 18, as seen in FIG. 9.

Referring to step 109, the stack 46 of prefired substrates 18 and the second mandrel 16 are fired. The heating may be executed using known firing techniques. The substrate is now an LTCC substrate 12, as shown in FIG. 10, and may be removed from the second mandrel 16.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for the fabrication of dome shaped low temperature cofired ceramic (LTCC) substrates, the method comprising the steps of:
    preparing a plurality of prefired substrates of ceramic and glass based material each to include a central portion and a plurality of segments extending therefrom;
    placing a first prefired substrate on a first mandrel with an arcuate shaped outer surface;
    positioning the segments of the first prefired substrate on the first mandrel to abut one another;
    placing a second prefired substrate on top of the first prefired substrate to form a stack;

positioning the segments of the second prefired substrate to abut one another;
placing additional prefired substrates on top of the stack;
removing the stack of prefired substrates from the first mandrel;
placing the stack of prefired substrates on a second mandrel that is smaller in circumference than the first mandrel; and
firing the stack of prefired substrates and the second mandrel.

2. The method of claim 1, further including the step of preparing the prefired substrates to have successively increasing diameters.

3. The method of claim 2, further including the step of placing additional prefired substrates on the stack in an order of successively increasing diameter from a bottom of the stack to a top of the stack.

4. The method of claim 1, wherein the second prefired substrate is rotated about the central portion at a first angle with respect to the first prefired substrate when it is placed thereon.

5. The method of claim 4, wherein the first angle is equal to one half times 360 degrees divided by the number of segments of each prefired substrate.

6. The method of claim 4, wherein the odd-numbered prefired substrates are rotationally aligned with one another and the even-numbered prefired substrates are rotationally aligned with one another and rotated with respect to the odd-numbered prefired substrates by the first angle.

7. The method of claim 1, wherein the central portion has a circular shape with the segments coupled to the circumference of the central portion.

8. The method of claim 1, wherein each segment includes a first edge, a second edge, and an end edge with the first and second edges opposing one another and the end edge positioned therebetween.

9. The method of claim 8, wherein the first edge and the second edge each have an inner end, an opposing outer end where the end edge is positioned, and a curvature outward away from one another.

10. The method of claim 8, wherein the diameter of the prefired substrate is the distance from the end edge of one segment to the end edge of an opposing segment.

11. The method of claim 8, wherein the end edges of the segments of the prefired substrates align with one another when the stack is formed.

12. The method of claim 1, further including the step of isostatically laminating the stack of prefired substrates as positioned on the first mandrel.

13. The method of claim 12, further including the step of placing an outer mold on the stack of prefired substrates before the prefired substrates and the first mandrel are isostatically laminated.

14. The method of claim 1, further comprising the step of forming the segments of each prefired substrate by removing ceramic and glass based material from a sheet of ceramic and glass based material.

15. A method for the fabrication of dome shaped low temperature cofired ceramic (LTCC) substrates, the method comprising the steps of:
preparing a plurality of prefired substrates of ceramic and glass based material each to include a central portion and a plurality of segments extending therefrom;
placing a first prefired substrate on a first mandrel with an arcuate shaped outer surface;
positioning the segments of the first prefired substrate on the first mandrel to abut one another;
placing a second prefired substrate on top of the first prefired substrate to form a stack, wherein the second prefired substrate is rotated about the central portion by a first angle with respect to the first prefired substrate when it is placed thereon;
positioning the segments of the second prefired substrate to abut one another;
placing additional prefired substrates on top of the stack;
removing the stack of prefired substrates from the first mandrel;
placing the stack of prefired substrates on a second mandrel that is smaller in circumference than the first mandrel; and
firing the stack of prefired substrates and the second mandrel.

16. The method of claim 15, further including the steps of preparing the prefired substrates to have successively increasing diameters and placing the prefired substrates on the stack in an order of successively increasing diameter from a bottom of the stack to a top of the stack.

17. The method of claim 15, wherein the odd-numbered prefired substrates are rotationally aligned with one another and the even-numbered prefired substrates are rotationally aligned with one another and rotated with respect to the odd-numbered prefired substrates by the first angle.

18. The method of claim 15, wherein
the central portion has a circular shape with the segments coupled to the circumference of the central portion,
each segment includes a first edge, a second edge, and an end edge with the first and second edges opposing one another and the end edge positioned therebetween,
the first edge and the second edge each have an inner end, an opposing outer end where the end edge is positioned, and a curvature outward away from one another, and
the diameter of the prefired substrate is the distance from the end edge of one segment to the end edge of an opposing segment.

19. The method of claim 18, wherein the end edges of the segments of the prefired substrates align with one another when the stack is formed.

20. The method of claim 15, wherein the first angle is equal to one half times 360 degrees divided by the number of segments of each prefired substrate.

21. The method of claim 15, further including the step of isostatically laminating the stack of prefired substrates as positioned on the first mandrel.

22. The method of claim 15, further comprising the step of forming the segments of each prefired substrate by removing ceramic and glass based material from a sheet of ceramic and glass based material.

23. A system for the fabrication of dome shaped low temperature cofired ceramic (LTCC) substrates, the system comprising:
a plurality of prefired substrates of ceramic and glass based material creating a stack, each prefired substrate including a circular central portion and a plurality of segments uniformly distributed along the circumference of the central portion, each segment including
a first edge and an opposing second edge, each with an inner end and an opposing outer end, and having a curvature outward away from one another, and
an end edge coupled to the outer end of the first edge and the second edge;
a first mandrel having a first circumference and configured to receive the prefired substrates while the stack is formed; and a second mandrel having a second circumference smaller than the first circumference and configured to retain the stack during a firing process.

24. The system of claim 23, wherein each prefired substrate has a diameter and the prefired substrates are formed to have successively increasing diameters.

25. The system of claim 24, wherein the diameter of each prefired substrate is the distance from the end edge of one segment to the end edge of an opposing segment.

26. The system of claim 24, wherein the stack includes prefired substrates of successively increasing diameter from a bottom of the stack to a top of the stack.

27. The system of claim 23, wherein the stack includes odd-numbered prefired substrates that are rotationally aligned and even-numbered prefired substrates that are rotationally aligned and rotated with respect to the odd-numbered prefired substrates by a first angle.

28. The system of claim 23, wherein the second circumference is smaller than the first circumference by an amount corresponding to the amount by which the material of each prefired substrate shrinks during the firing process.

29. The system of claim 23, wherein the first mandrel and the second mandrel are each dome shaped.

* * * * *